US00RE48044E

(19) United States
(12) Reissued Patent
Kang et al.

(10) Patent Number: US RE48,044 E
(45) Date of Reissued Patent: Jun. 9, 2020

(54) ORGANIC ELECTROLUMINESCENCE EMITTING DISPLAY

(71) Applicant: Samsung Display Co., Ltd., Yongin-si, Gyeonggi-do (KR)

(72) Inventors: Ki-Nyeng Kang, Yongin-si (KR); Na-Young Kim, Yongin-si (KR)

(73) Assignee: SAMSUNG DISPLAY CO., LTD., Yongin-si, Gyeonggi-Do (KR)

(21) Appl. No.: 15/089,311

(22) Filed: Apr. 1, 2016

Related U.S. Patent Documents

Reissue of:
(64) Patent No.: 8,686,927
Issued: Apr. 1, 2014
Appl. No.: 13/228,727
Filed: Sep. 9, 2011

(30) Foreign Application Priority Data

Oct. 28, 2010 (KR) ..... 10-2010-0105790

(51) Int. Cl.
*G09G 3/30* (2006.01)
*G09G 3/3233* (2016.01)

(52) U.S. Cl.
CPC ... *G09G 3/3233* (2013.01); *G09G 2300/0426* (2013.01); *G09G 2300/0852* (2013.01); *G09G 2300/0861* (2013.01); *G09G 2320/0233* (2013.01)

(58) Field of Classification Search
CPC .. G09G 3/00; G09G 3/30; G09G 3/32; G09G 3/3208; G09G 3/3216; G09G 3/3225; G09G 3/3233; G09G 3/3241; G09G 3/325; G09G 3/3258; G09G 3/3283; G09G 2320/0233; G09G 2300/0426; G09G 2300/0852; G09G 2300/0861; H05B 37/02; H01L 33/0079
See application file for complete search history.

(56) References Cited

U.S. PATENT DOCUMENTS 7,072,096 B2 * 7/2006 Holman ..... F21S 8/08 257/E25.02
7,460,094 B2 * 12/2008 Ozawa ..... 345/82
7,924,041 B2 * 4/2011 No ..... G02F 1/136259 324/760.01
8,188,496 B2 * 5/2012 Cho ..... H01L 33/0079 257/100

(Continued)

FOREIGN PATENT DOCUMENTS

KR 10-2005-0065947 A 6/2005
KR 10-0517251 B1 9/2005

(Continued)

OTHER PUBLICATIONS

Korean Office Action dated Sep. 22, 2016 for Korean Patent Application No. KR 10-2010-0105790 which cites the above-identified references No. 1-2, and from which priority is claimed by subject U.S. Appl. No. 15/089,311.

*Primary Examiner* — Samuel G Rimell
(74) *Attorney, Agent, or Firm* — F. Chau & Associates, LLC

(57) ABSTRACT

An organic light emitting display capable of substantially preventing IR drop of a power source wiring line and coupling of data lines is disclosed. In one aspect, the organic light emitting display includes pairs of data lines between adjacent sub-pixels. The data lines are arranged to run parallel with a coupling blocking wiring line provided between each pair.

29 Claims, 5 Drawing Sheets

(56) References Cited

U.S. PATENT DOCUMENTS

| | | | | |
|---|---|---|---|---|
| 8,358,299 | B2 * | 1/2013 | Chaji | G09G 3/3233 345/211 |
| 8,487,843 | B2 * | 7/2013 | Goh | G09G 3/3233 315/169.3 |
| 9,058,775 | B2 * | 6/2015 | Nathan | G09G 3/3233 |
| 9,153,172 | B2 * | 10/2015 | Nathan | G09G 3/3233 |
| 9,330,598 | B2 * | 5/2016 | Nathan | G09G 3/3233 |
| 9,370,075 | B2 * | 6/2016 | Chaji | H05B 37/02 |
| 9,824,632 | B2 * | 11/2017 | Chaji | G09G 3/3233 |
| 2005/0017934 | A1 * | 1/2005 | Chung et al. | 345/82 |
| 2005/0140306 | A1 * | 6/2005 | Park | 315/169.3 |
| 2005/0264498 | A1 * | 12/2005 | Asano | 345/76 |
| 2009/0135102 | A1 * | 5/2009 | Park | 345/76 |
| 2010/0085341 | A1 * | 4/2010 | Hasegawa | G09G 3/3233 345/208 |

FOREIGN PATENT DOCUMENTS

| | | | |
|---|---|---|---|
| KR | 10-0560780 | B1 | 3/2006 |
| KR | 10-2008-0062309 | A | 3/2008 |
| KR | 10-2008-0062309 | A | 7/2008 |
| KR | 10-2009-0054704 | A | 6/2009 |

* cited by examiner

AMENDED
FIG. 3B
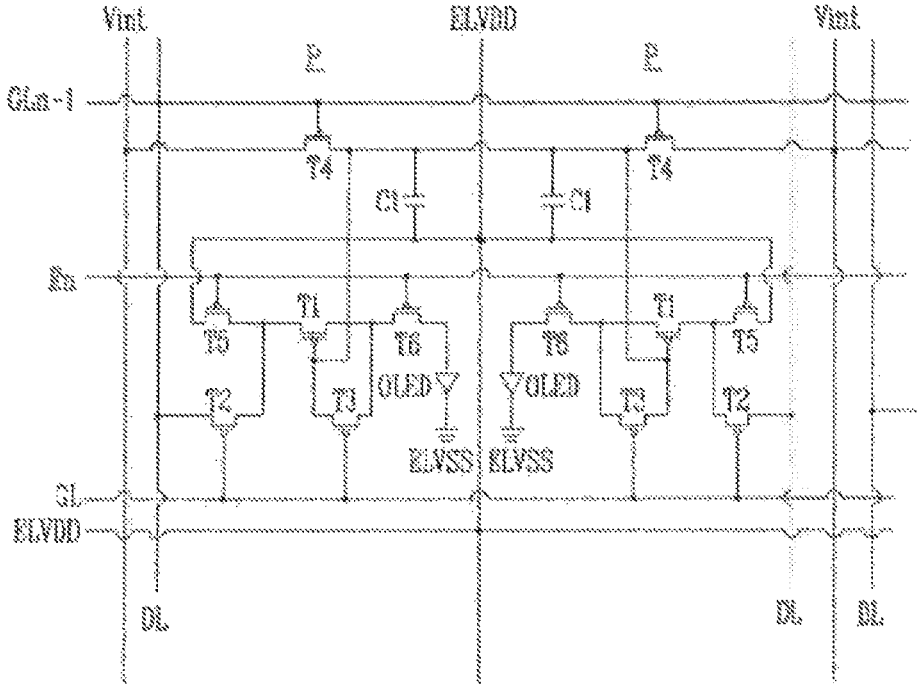

ORGANIC ELECTROLUMINESCENCE EMITTING DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to and the benefit of Korean Patent Application No. 10-2010-0105790, filed on Oct. 28, 2010, in the Korean Intellectual Property Office, the entire content of which is incorporated herein by reference.

BACKGROUND

1. Field

The disclosed technology relates to a display, and more particularly, to an organic light emitting display capable of preventing a voltage drop in power source wiring lines and of preventing the coupling of data lines to improve yield.

2. Description of the Related Technology

With the development of information technology, while demand for organic light emitting displays increases, research on displays such as liquid crystal displays (LCD), plasma display panels (PDP). field emission displays (FED), electrophoretic displays (EPD), organic electroluminescence emitting displays (OLED) continues.

In an organic light emitting display, light is generated as a result of recombination of electrons supplied by a cathode and holes supplied by an anode.

An organic light emitting display may realize low voltage driving, have high response speed, high brightness, is thin, and may display all of the colors in a visible region to satisfy various needs of users.

An organic light emitting display includes gate wiring lines and data wiring lines that perpendicularly intersect each other and a plurality of sub-pixels connected to power source wiring lines separated from the data wiring lines by a uniform distance. The power source wiring line functions as a storage capacitor for storing a signal in the data wiring line and a path through which current flows through a driving transistor in the sub-pixels.

An IR drop in the power source wiring line is less near a power supply source. Conversely, the IR drop in the power source wiring line remote from the power supply source is greater.

In the conventional organic light emitting display, due to the IR drop of the power source wiring line varying in accordance with the position of each sub-pixel, the amount of current in each sub-pixel varies with the position of each sub-pixel so that emission brightness is non-uniform. Such a problem is severe for large panels.

In order to prevent the IR drop of the power source wiring line, a method of increasing the width of the power source wiring line in the layout structure of an array unit is used. However, since the possibility of generating a short among various wiring lines, such as the power source wiring line, the gate wiring line, the data wiring line, or an initializing power source wiring line increases as the width of the power source wiring line increases. Accordingly, there are limitations on increasing the width of the power source wiring line.

SUMMARY OF CERTAIN INVENTIVE ASPECTS

One inventive aspect is an organic light emitting display. The display includes a plurality of sub-pixels formed near intersections of a plurality of gate lines and a plurality of data lines, and a driving power source wiring line connected to two adjacent sub-pixels to supply a power source voltage for driving the sub-pixels. The plurality of data lines includes a pair of data lines arranged to run parallel with the driving power source wiring line with sub-pixels interposed between the driving power source wiring line and the pair of data lines, and a coupling blocking wiring line between the data lines that of the pair.

BRIEF DESCRIPTION OF THE DRAWINGS

The accompanying drawings, together with the specification, illustrate exemplary embodiments, and, together with the description, serve to explain various aspects and principles.

FIG. 3B is a schematic circuit diagram illustrating the organic light emitting display according to the embodiment of FIG. 3A.

DETAILED DESCRIPTION OF CERTAIN INVENTIVE EMBODIMENTS

Figure 1:
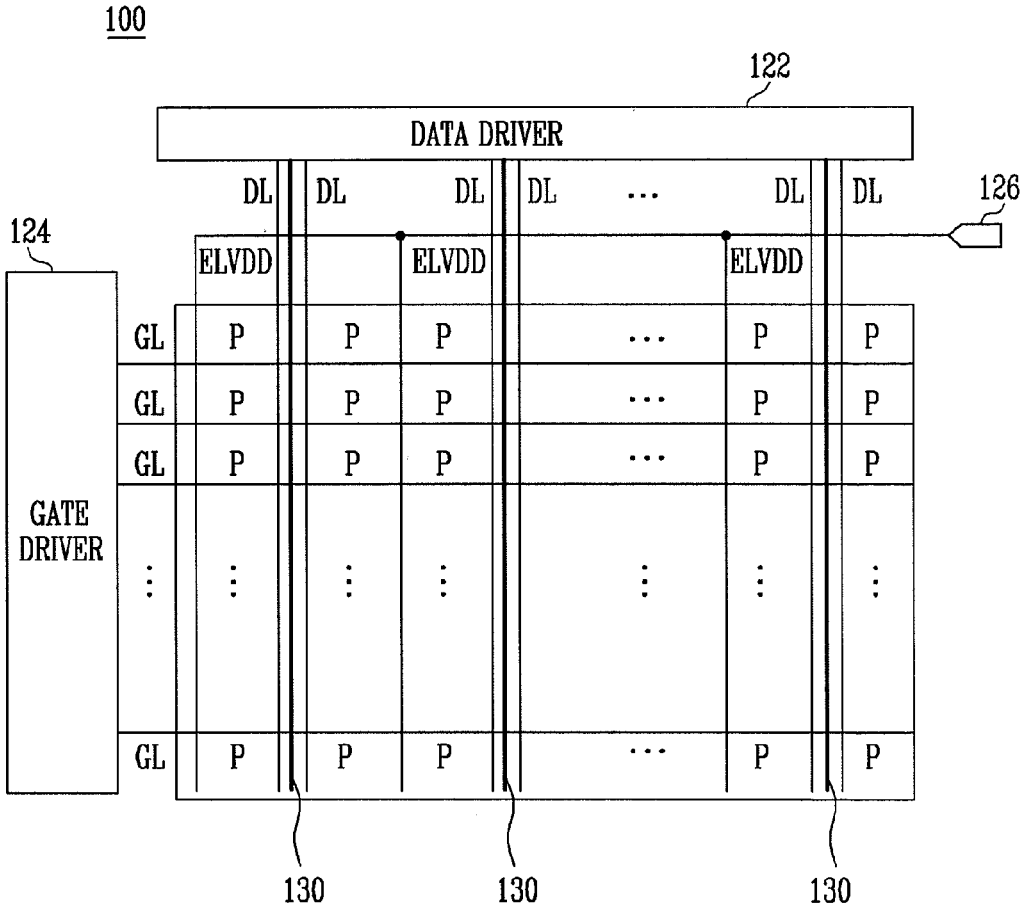
FIG. 1 is a block diagram illustrating the structure of an organic light emitting display according to an embodiment

Hereinafter, certain exemplary embodiments are described with reference to the accompanying drawings. Here, when a first element is described as being coupled to a second element, the first element may be not only directly coupled to the second element but may be indirectly coupled to the second element via a third element. Further, some of the elements that are not essential to the complete understanding of the invention may be omitted for clarity. Also, like reference numerals generally refer to like elements throughout.

Hereinafter, an organic light emitting display according to an embodiment is described with reference to the accompanying drawings.

Here, shapes, sizes, ratios, angles, and numbers that are illustrated in the accompanying drawings may be changed. Since the drawings are depicted from observer's eyes, the directions and positions illustrating the drawings may be variously changed according to the observer's position. In some cases, different reference numerals may be assigned to the same part.

In the case where the terms 'comprising', 'having', and 'including' are used, another term may be added when the term 'only' is not used. A single instance of an element does not preclude the existence of additional similar or identical elements. In general, even if shapes, comparison of size, and positional relationship are not modified by terms such as 'about', 'substantially', etc., the shapes, comparison of size, and positional relationship are understood to be approximate.

Although the terms 'after', 'before', 'then', 'and', 'here', 'next', 'at this time', and 'in this case' are used, the terms do not limit temporal relationships to the described embodiments. The terms 'first', 'second', and 'third', etc. are used to distinguish selectively, exchangeably, or repeatedly, but do not suggest an order.

In the case where positional relationship between two parts such as 'on', 'above', 'under', and 'beside' is described, one or more other part may be positioned between the two parts when the term 'directly' is not used. When parts are connected by the term 'or', the connection is interpreted to include not only the parts but also the combinations of the parts.

Referring to FIG. 1, an organic light emitting display 100 according to an embodiment of the present invention includes a plurality of sub-pixels P formed at the perpendicular intersections of a plurality of data lines DL and a plurality of gate lines GL, a data driver 122 for transmitting data signals to the plurality of data lines DL, and a gate driver 124 for transmitting gate signals to a plurality of gate lines GL.

In addition, the organic light emitting display includes a plurality of driving power source wiring lines ELVDD for transmitting driving voltages to the plurality of sub-pixels P, a power supply source 126 for supplying driving voltages to the plurality of driving power source wiring lines ELVDD, and a plurality of coupling blocking wiring lines 130.

The two data lines DL make a pair and are arranged to run parallel with each other between adjacent sub-pixels P to transmit data signals to the adjacent sub-pixels P. The data lines DL are arranged to run parallel with the driving power source wiring lines ELVDD with the sub-pixels P interposed between wiring lines ELVDD and the data lines DL. A coupling blocking wiring line 130 is provided between the two adjacent data lines DL.

The coupling blocking wiring line 130 may be, for example, a compensation signal wiring line or an initializing power source wiring line. The coupling blocking wiring line 130 may be formed, for example, of the same opaque conductive material on the same layer as the data lines DL.

The coupling blocking wiring line 130 is provided between the two adjacent data lines DL to prevent coupling generated between the two adjacent data lines DL. As a result, the data signals transmitted through the data lines DL are supplied so that the organic light emitting display may be stably driven.

Since the two data lines DL are between the adjacent sub-pixels P and the coupling blocking wiring line 130 is provided between the data lines DL, the width of the driving power source wiring line ELVDD may be maximized.

In addition, since the width of the driving power source wiring line ELVDD may be maximized, the voltage drop is reduced so that the picture quality of the organic light emitting display is substantially uniform and so that the organic light emitting display may be stably driven.

When an initializing power source wiring line is the coupling blocking wiring line 130, since one initializing wiring line is provided per two sub-pixels P so that the number of lines may be minimized, potential shorts caused by foreign substances generating during patterning may be reduced so that yield may be improved.

The data driver 122 is coupled to the plurality of data lines DL and generates data signals to transmit the data signals input in a row to the sub-pixels P through the data lines DL.

A gate driver 124 is coupled to a plurality of gate lines GL and generates gate signals to sequentially transmit the generated gate signals to the sub-pixels P through the gate lines GL.

The power source supply unit 126 drives voltages to the sub-pixels P through the plurality of driving power, source wiring lines ELVDD. One driving power source wiring line ELVDD transmits a driving voltage to two adjacent sub-pixels P shared and is provided to run parallel with a data line DL with a sub-pixel P interposed. The driving power source wiring may have a mesh structure, in which the driving power source wiring line ELVDD provided to run parallel with the gate line GL is additionally provided.

Hereinafter, the organic light emitting display is described based on one sub-pixel and another sub-pixel adjacent to the one sub-pixel. However, the present invention may be applied to the other sub-pixels formed in the organic light emitting display.

Figure 2A:
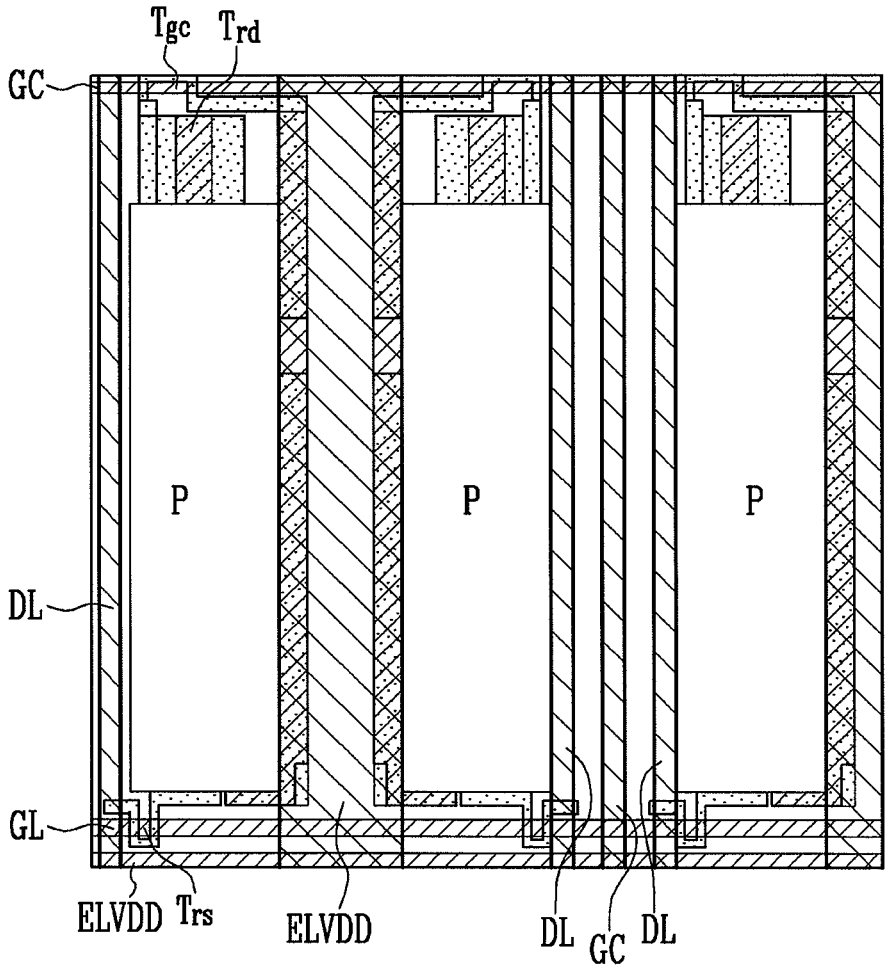
FIG. 2A is a layout diagram of an organic light emitting display according to some embodiments.
Figure 2B:
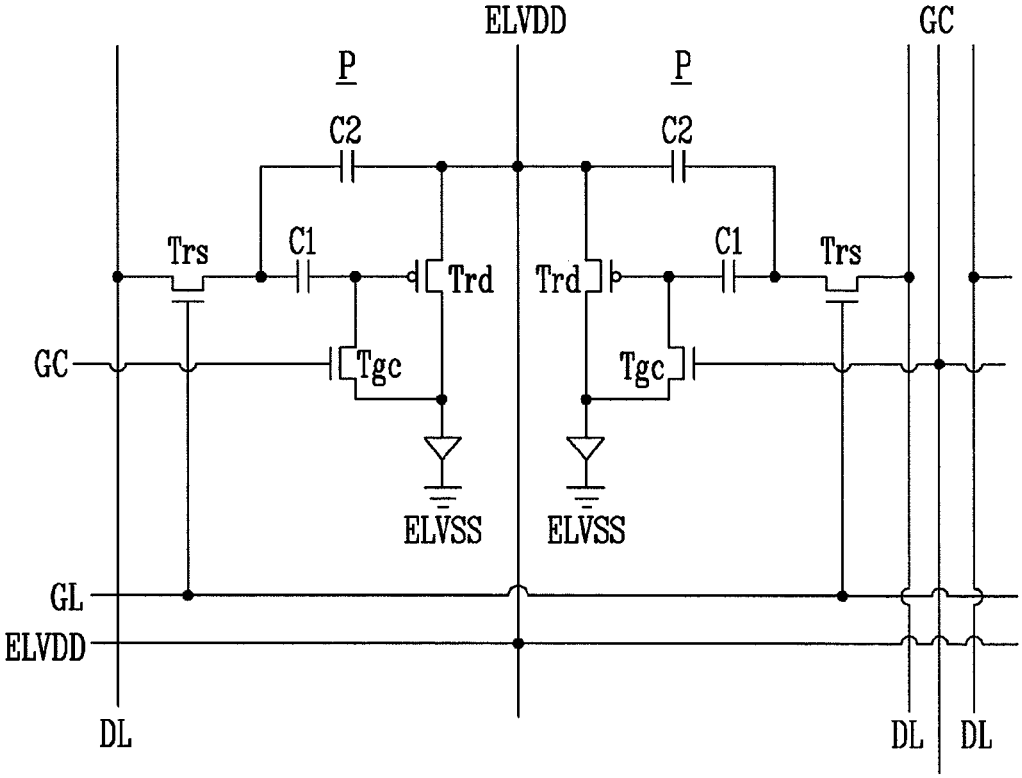
FIG. 2B is a schematic circuit diagram illustrating the organic light emitting display according to the embodiment of FIG. 2A.

Referring to FIGS. 2A and 2B, the organic light emitting display according to some embodiments includes a plurality of sub-pixels P formed near the perpendicular intersections of a plurality of gate lines GL and a plurality of data lines DL, a plurality of driving power source wiring lines ELVDD for supplying power source to the plurality of sub-pixels P, and compensation signal wiring lines GC for compensating for the characteristics of the plurality of sub-pixels P.

The sub-pixels P are near intersections of the plurality of gate lines GL and the plurality of data lines DL. The sub-pixel P includes an organic light emitting diode (OLED) for displaying an image by driving current, a driving transistor Trd electrically coupled to the OLED to supply driving current, a switching transistor Trs, a compensation transistor Tgc, and capacitors C1 and C2.

The OLED includes an anode electrically coupled to the driving transistor Trd and a cathode electrically coupled to a ground power source wiring line ELVSS. The OLED generates one of red (R), green (G), and blue (B) light components to correspond to the driving current supplied by the driving transistor Trd.

The driving transistor Trd is a switching element for transmitting driving current corresponding to the data signal supplied from the data line DL to the OLED.

Therefore, the driving transistor Trd includes a first electrode (a source or a drain) electrically coupled to the driving power source wiring line ELVDD, a second electrode (a drain or a source) electrically coupled to the anode of the OLED, and a gate electrode that operates in accordance with the data signal supplied from the data line DL.

The first electrode is one of a drain electrode and a source electrode and the second electrode is the other electrode from the first electrode. For example, when the first electrode is the source electrode, the second electrode is the drain electrode.

The switching transistor Trs is a switching element turned on when a gate signal is supplied to the gate line GL to supply the data signal supplied to the data line DL to the capacitors C1 and C2.

Therefore, the switching transistor Trs includes a first electrode coupled to the data line DL, a second electrode coupled to the gate electrode of the driving transistor Trd, and a gate electrode coupled to the gate line GL. The second electrode of the switching transistor Trs is electrically coupled to a node between the capacitors C1 and C2 to transmit the data signal supplied to the data line DL to the driving transistor Trd.

The compensation transistor Tgc is a switching element turned on when the compensation signal of the compensation signal wiring line GC is supplied to transmit the driving current corresponding to the data signal to the OLED and to compensate for the characteristic of the driving transistor Trd.

Therefore, the compensation transistor Tgc includes a first electrode coupled to the driving current corresponding to the data signal or the voltage charged in the capacitor C1, a second electrode electrically coupled to the anode of the OLED, and a gate electrode electrically coupled to the compensation signal wiring line GC.

The capacitors C2 and C1 are electrically coupled between the power source wiring line ELVDD and the second electrode of the switching transistor Trs and the second electrode of the switching transistor Trs and the gate electrode of the driving transistor Trd. The capacitors C2 and C1 maintain the data voltage applied to the gate electrode of the driving transistor Trd for a uniform period so that the voltage required for the emission of the OLED is maintained.

The driving power source wiring line ELVDD and the ground power source wiring line ELVSS supply a power source voltage and a reference voltage for driving the sub-pixel P. The voltage supplied by the ground power source wiring line ELVSS has a lower voltage level than the voltage level supplied by the driving power source wiring line ELVDD. That is, the ground power source wiring line ELVSS may, for example, have one voltage level selected between a ground voltage and a negative voltage.

The driving power source wiring line ELVDD may have a mesh structure formed of the driving power source wiring lines ELVDD provided in a column (vertical) direction between adjacent sub-pixels P and driving power source wiring lines ELVDD provided in a row (horizontal) direction to run parallel with the gate line GL.

The column directional driving power source wiring line ELVDD may be connected to adjacent sub-pixels P. The column directional driving power source wiring lines ELVDD run parallel with the data lines DL with the sub-pixels P interposed between. In addition, the row directional driving power source wiring lines ELVDD may be provided to run parallel with the compensation signal wiring lines GC.

The compensation signal wiring line GC supplies the compensation signal corresponding to the data signal to the OLED to compensate the characteristic of the sub-pixel P. The compensation signal wiring line GC may be formed on the same layer as the column directional driving power source wiring line ELVDD of the same material or may be formed on the same layer as the data line DL of the same material.

The compensation signal wiring line GC may have a mesh structure formed of the compensation signal wiring line GC provided in a column (vertical) direction to run parallel with a data line DL between adjacent data lines DL and the compensation signal wiring line GC provided in a row (horizontal) direction to run parallel with the gate line GL. The row directional compensation signal wiring line GC supplies a compensation signal to the column directional compensation signal wiring line GC.

The column directional compensation signal wiring line GC is provided between adjacent data lines arranged between adjacent sub-pixels P, that is, a pair of data lines DL. Since the compensation signal wiring line GC is provided in a column (vertical) direction to run parallel with a data line DL between adjacent data lines DL, a coupling phenomenon between adjacent data lines DL is prevented.

In addition, in some embodiments, the compensation signal wiring line GC is provided between the adjacent data lines DL arranged to run parallel with the driving power source wiring line ELVDD with the sub-pixel P interposed so that the width of the column direction driving power source wiring line ELVDD may be maximized.

As described above, in the organic light emitting display, since the width of the driving power source wiring line may be maximized, it is possible to prevent the IR drop quality degradation. Since the adjacent data wiring lines are isolated from each other to prevent the coupling of the data lines, the picture quality of the organic light emitting display may be uniform and the organic light emitting display may be stably driven.

On the other hand, the two data lines DL make a pair and are arranged to run parallel with each other between the two adjacent sub-pixels P to transmit data signals to the sub-pixels P. Each data line DL is provided to run parallel with the driving power source wiring line ELVDD with the sub-pixel P interposed therebetween. As described above, the column direction compensation signal wiring line GC may be provided between the two adjacent data lines DL.

The sub-pixels P may be symmetrical with each other using the column directional driving power source wiring line ELVDD as an axis.

Figure 3A:
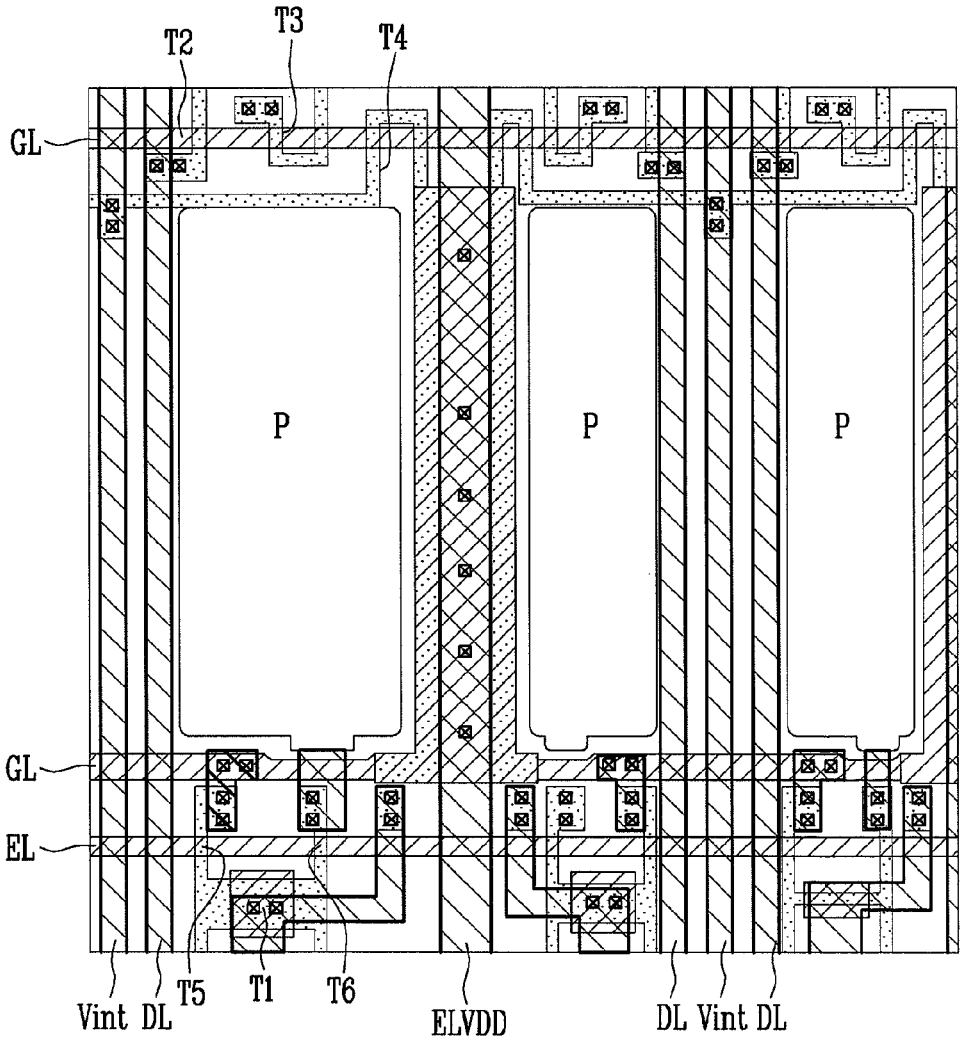
FIG. 3A is a layout diagram illustrating an organic light emitting display according to some embodiments.

Referring to FIGS. 3A and 3B, an organic light emitting display according to some embodiments includes a plurality of sub-pixels P formed near the intersections of the plurality of gate lines GLn−1 and GL and the plurality of data lines DL and a plurality of power source wiring lines ELVDD, ELVSS, and Vint for supplying power source to the plurality of sub-pixels P.

The sub-pixels P are each near intersections of the plurality of gate lines GLn−1 and GL and the plurality of data lines DL. The sub-pixel P includes an organic light emitting diode (OLED) for displaying an image by driving current, a first switching element T1 electrically coupled to the OLED to supply driving current, a capacitor C1, second to sixth switching elements T2 to T6, and an emission control wiring line En.

The OLED includes an anode electrically coupled to a first switching element T1 and a cathode electrically coupled to the ground power source wiring line ELVSS. The OLED generates one of red (R), green (G), and blue (B) light components to correspond to the driving current supplied through the first switching element T1.

The first switching element T1 is a driving switching element for transmitting the driving current corresponding to the data signal supplied from the data line DL to the OLED.

The first switching element T1 includes a first electrode (a source or a drain) electrically coupled to the first power source wiring line ELVDD via the fifth switching element T5, a second electrode (the drain or the source) electrically coupled to the anode electrode of the OLED via the sixth switching element T6, and a gate electrode that operates in accordance with the data signal supplied from the data line DL.

Here, the first electrode is one of the drain electrode and the source electrode and the second electrode is the other electrode from the first electrode. For example, when the first electrode is the source electrode, the second electrode is the drain electrode.

The capacitor C1 stores the voltage corresponding to the data signal between the first electrode (the source or the drain) of the first switching element T1 and the gate electrode of the first electrode (the source or the drain) to maintain the voltage required for the emission of the OLED.

The capacitor C1 is positioned between the first switching element T1 and the first power source wiring line ELVDD.

The capacitor C1 includes a first electrode electrically coupled to the control electrode (or the gate electrode) of the first switching element T1 and a second electrode electrically so coupled to the first power source wiring line ELVDD and the first electrode (the source or the drain) of the first switching element T1.

The second switching element t2 is a switching element turned on when a gate signal is supplied to the gate line GL to supply the data signal supplied to the data line DL to the capacitor c1 via the first electrode of the first switching element T1.

Therefore, the second switching element T2 includes a first electrode coupled to the data line DL, a second electrode coupled to the first electrode of the first switching element T1, and a gate electrode coupled to the gate line GL.

The third switching element T3 is a switching element turned on when the gate signal is supplied to the gate line GL to couple the first switching element T1 in the form of a diode.

Therefore, the third switching element t3 includes a gate electrode electrically coupled to the gate line GL, a first electrode electrically coupled to the second electrode of the first switching element t1, and a second electrode electrically coupled to the gate electrode of the first switching element t1. The second electrode of the third switching element T3 may be electrically coupled to the first electrode of the capacitor c1.

The fourth switching element T4 is an initializing switching element turned on when a previous gate signal is supplied to initialize the voltage stored in the capacitor C1. The voltage value of the initializing power source wiring line Vint is lower voltage than the voltage value of the data signal, for example, a negative voltage value.

The fourth switching element T4 includes a gate electrode electrically coupled to a previous gate line GLn−1, a first electrode electrically coupled to the first electrode of the capacitor C1, and a second electrode electrically coupled to the initializing power source wiring line Vint. The first electrode of the fourth switching element T4 may be electrically coupled to the gate electrode of the first switching element T1 or the second electrode of the third switching element T3.

An initializing operation is performed by initializing a voltage stored in the capacitor C1, that is, the voltage of the first switching element T1 since the fourth switching element T4 is turned on by a previous gate signal and the other switching elements are turned off by a current gate signal and a current emission control signal in an initializing period where the previous gate signal is in a low level and the current gate signal and the current emission control signal are in a high level.

The fifth switching element T5 is a switching element for transmitting the driving power source voltage of the driving power source wiring line ELVDD to the first electrode of the first switching element T1 in accordance with the emission control signal supplied by the emission control wiring line En. The fifth switching element T5 is turned on when an emission control signal is not supplied (that is, a low voltage is supplied) to electrically couple the driving power source wiring line ELVDD to the first switching element T1.

Therefore, the fifth switching element t5 includes a first electrode electrically coupled to the driving power source wiring line ELVDD, a second electrode electrically coupled to the first electrode of the first switching element T1, and a gate electrode electrically coupled to the emission control wiring line En.

The sixth switching element T6 is a switching element for controlling the driving current that flows from the first switching element T1 to the OLED in accordance with the emission control signal supplied from the emission control wiring line En to determine the emission time of the OLED. The sixth switching element T6 is turned on when the emission control signal is not supplied (that is, the low voltage is supplied) to electrically couple the first switching element T1 to the OLED.

The sixth switching element T6 includes a first electrode electrically coupled to the second electrode of the first switching element T1, a second electrode electrically coupled to the anode of the OLED, and a gate electrode electrically coupled to the emission control wiring line En. The sixth switching element T6 may be electrically coupled to the first electrode of the third switching element T3.

The driving power source wiring line ELVDD and the ground power source wiring line ELVSS supply a power source voltage and a reference voltage for driving the sub-pixel P. The voltage supplied by the ground power source wiring line ELVSS has a lower voltage level than the voltage level supplied by the driving power source wiring line ELVDD. That is, the ground power source wiring line ELVSS may, for example, have one voltage level selected from the ground voltage and the negative voltage.

The driving power source wiring line ELVDD may have a mesh structure formed of the driving power source provided in a column (vertical) direction between adjacent sub-pixels P and the driving power source wiring lines ELVDD provided in a row (horizontal) direction to run parallel with the gate line GL.

The column direction driving power source wiring line ELVDD supplies a driving power source voltage to adjacent sub-pixels P shared. The column direction driving power source wiring line ELVDD is provided to run parallel with the data line DL with the sub-pixel P interposed. In addition, the row direction driving power source wiring lines ELVDD may be provided to run parallel with the initializing power source wiring lines Vint with the sub-pixels P interposed between.

The initializing power source wiring line Vint supplies an initializing voltage for initializing the sub-pixel P. The initializing power source wiring line Vint has a lower voltage level than the data signal having the lowermost voltage level among the data signals supplied to the capacitor C1.

The initializing power source wiring line Vint is electrically coupled to the second electrode of the fourth switching element T4. The initializing power source wiring line Vint is electrically coupled to the second electrodes of the fourth switching elements T4 that are the initializing switching elements of the adjacent sub-pixels P so that the two sub-pixels P share the initializing power source.

The initializing power source wiring line Vint is provided to share the adjacent two sub-pixels P. The two sub-pixels P connected to the same initializing power source wiring line Vint are not the same as the two sub-pixels P connected to the same the driving power source wiring line ELVDD. The initializing power source wiring line Vint is provided in a column (vertical) direction to run parallel with a data line DL between adjacent data lines DL arranged between adjacent sub-pixels P, that is, a pair of data lines DL. Since the initializing power source wiring line Vint is provided in a column (vertical) direction to run parallel with a data line DL between adjacent data lines DL, the adjacent data lines DL are isolated from each other so that a coupling between the adjacent data lines DL is substantially prevented.

In addition, one initializing power source wiring line Vint is provided for two sub-pixels so that the initializing power source wiring line Vint is provided between the adjacent data lines DL arranged to run parallel with the driving power source wiring line ELVDD with the sub-pixel P interposed. Therefore, the width of the column direction driving power source wiring line ELVDD may be maximized.

As described above, in the organic light emitting display according to some embodiments, the generation of IR drop is substantially prevented since the width of the driving power source wiring line may be maximized and the picture quality of the organic light emitting display may be uniform and the organic light emitting display may be stably driven since the adjacent data wiring lines are isolated from each other to substantially prevent the coupling of the data lines.

The initializing power source wiring line Vint may be formed on the same layer as the column direction driving power source wiring line ELVDD of the same material or may be formed on the same layer as the data line DL of the same material.

Since the number of patternings (processing steps) may be reduced as the number of initializing power source wiring lines Vint is reduced, the processing is simplified and shorts between the wiring lines, which is caused by foreign substances generated during patterning, may be reduced so that yield may be improved.

The two adjacent data lines DL form a pair and are arranged to run parallel with each other between the two adjacent sub-pixels P to transmit the data signals to the adjacent sub-pixels P. The data line DL is provided to run parallel with the driving power source wiring line ELVDD with the sub-pixel P interposed. As described above, the initializing power source wiring line Vint is provided between the two adjacent data lines DL as described above.

The sub-pixels P may be symmetrical with each other using the column direction driving power source wiring line ELVDD as an axis.

While various aspects have been described in connection with certain exemplary embodiments, it is to be understood that the invention is not limited to the disclosed embodiments, but, on the contrary, is intended to cover various modifications and equivalent arrangements.

What is claimed is:

1. An organic light emitting display, comprising:

a plurality of sub-pixels formed near intersections of a plurality of gate lines and a plurality of data lines; and a driving power source wiring line connected to two adjacent sub-pixels to supply a power source voltage for driving the *plurality of* sub-pixels, wherein the plurality of data lines comprises a pair of data lines arranged to run parallel with the driving power source wiring line with sub-pixels interposed between the driving power source wiring line and the pair of data lines, and a coupling blocking wiring line between the data lines that of the pair, wherein the driving power source wiring line has a mesh structure formed of a plurality of column direction driving power source wiring lines running parallel with the data lines and a plurality of row direction driving power source wiring lines running parallel with the gate lines, and wherein the coupling blocking wiring line has a mesh structure formed of a plurality of column direction coupling blocking wiring lines running parallel with the driving power source lines, but separated by sub-pixels interposed between the coupling blocking wiring lines and the driving power source lines, and a plurality of row direction coupling blocking wiring lines running parallel with the gate lines.

2. The organic light emitting display as claimed in claim 1, wherein the coupling blocking wiring line is a compensation signal wiring line or an initializing power source wiring line.

3. The organic light emitting display as claimed in claim 2, wherein the coupling blocking wiring line comprises the compensation signal wiring line and is part of the mesh structure in which the compensation signal wiring line is connected to compensation signal wiring lines running parallel with the gate lines.

4. The organic light emitting display as claimed in claim 2, wherein the coupling blocking wiring line comprises the compensation signal wiring line and is formed on the same layer as the data line of the same material.

5. The organic light emitting display as claimed in claim 2, wherein the coupling blocking wiring line comprises the initializing power source wiring line and is provided to run parallel with the driving power source wiring line.

6. The organic light emitting display as claimed in claim 2, wherein the coupling blocking wiring line comprises the initializing power source wiring line and is formed on the same layer as the data line of the same material.

7. The organic light emitting display as claimed in claim 1, wherein [the sub-pixel] *each of the plurality of subpixels* comprises:

an organic light emitting diode (OLED);

a driving transistor electrically coupled to the OLED to supply driving current;

a capacitor configured to maintain a data voltage applied to a gate electrode of the driving transistor;

a switching transistor configured to supply a data signal from the data line to the capacitor in response to a gate signal of the gate line; and a compensation transistor configured to transmit driving current corresponding to the data signal to the OLED.

8. The organic light emitting display as claimed in claim 7, wherein the coupling blocking wiring line comprises a compensation signal wiring line, and wherein a gate of the compensation transistor is directly connected to the compensation signal wiring line.

9. The organic light emitting display as claimed in claim 7, wherein the capacitor is electrically coupled between the driving power source wiring line and a source or drain electrode of the switching transistor.

10. The organic light emitting display as claimed in claim 1, wherein the sub-pixel comprises:

an OLED for displaying an image;

a first switching element configured to transmit driving current to the OLED according to a data signal supplied from the data line;

a capacitor configured to store a voltage corresponding to the data signal;

a second switching element configured to be turned on when a gate signal is supplied to the gate line, and when turned on to supply the data signal to the capacitor;

a third switching element configured to be turned on when the gate signal is supplied to the gate line, and when turned on to diode connect the first switching element;

a fourth switching element configured to initialize a voltage stored in the capacitor, the capacitor connected to a drain or source of the fourth switching element and a second electrode of the second switching element;

a fifth switching element configured to transmit the driving power source voltage to the first switching element in accordance with an emission control signal supplied by an emission control wiring line; and a sixth switching element configured to control driving current that flows from the first switching element to the OLED in accordance with the emission control signal of the emission control wiring line.

11. The organic light emitting display as claimed in claim 10, wherein the coupling blocking wiring line comprises an initializing power source wiring line.

12. The organic light emitting display as claimed in claim 11, wherein the initializing power source wiring lines are electrically directly coupled to a source or drain of the fourth switching element.

13. The organic light emitting display as claimed in claim 11, wherein the initializing power source wiring line is connected to the two adjacent sub-pixels; and wherein one of the sub-pixels connected to the initializing power source wiring line is one of the two sub-pixels connected to the driving power source wiring line.

14. The organic light emitting display as claimed in claim 11, wherein the initializing power source wiring line is coupled to the fourth switching elements of the adjacent sub-pixels.

*15. An organic light emitting display, comprising:*

*a plurality of sub-pixels formed near intersections of a plurality of gate lines and a plurality of data lines;*

*a plurality of driving power source wiring lines having a mesh structure including a plurality of column direction driving power source wiring lines parallel with the data lines and a plurality of row direction driving power source wiring lines parallel with the gate lines; and*

*a plurality of coupling blocking wiring lines having a mesh structure including a plurality of column direction coupling blocking wiring lines parallel with the column direction driving power source wiring lines and a plurality of row direction coupling blocking wiring lines parallel with the gate lines,*

*wherein one of the column direction driving power source wiring lines is between first and second column direction coupling blocking wiring lines of the column direction coupling blocking wiring lines,*

*wherein the first and second column direction coupling blocking wiring lines are separated by first and second sub-pixels of the sub-pixels,*

*wherein the first sub-pixels are interposed between the first column direction coupling blocking wiring line and the one of the column direction driving power source wiring lines, and*

*wherein the second sub-pixels are interposed between the second column direction coupling blocking wiring line and the one of the column direction driving power source wiring lines.*

*16. The organic light emitting display as claimed in claim 15, wherein one of the column direction coupling blocking wiring lines is interposed between two adjacent data lines of the data lines.*

*17. The organic light emitting display as claimed in claim 15, wherein the column direction coupling blocking wiring lines are formed on the same layer as the data lines of a same material.*

*18. The organic light emitting display as claimed in claim 15, wherein one of the sub-pixels comprises:*

*an organic light emitting diode (OLED);*

*a first transistor including a first electrode connected to one of the driving power source wiring lines and a second electrode connected to the OLED;*

*a first capacitor including a first electrode and a second electrode, the first electrode of the first capacitor connected to a gate electrode of the first transistor;*

*a second transistor including a first electrode connected to one of the data lines and a second electrode connected to the second electrode of the first capacitor; and*

*a third transistor including a first electrode connected to the second electrode of the first transistor and a second electrode connected to the gate electrode of the first transistor.*

*19. The organic light emitting display as claimed in claim 18, wherein the one of the sub-pixels further comprises a second capacitor including a first electrode connected to the one of the driving power source wiring lines and a second electrode connected to the second electrode of the second transistor.*

*20. An organic light emitting display, comprising:*

*a plurality of gate lines in a first direction;*

*a plurality of data lines in a second direction crossing the first direction;*

*a plurality of sub-pixels formed near intersections of the gate lines and the data lines;*

*a plurality of first power lines having a mesh structure including a plurality of first direction first power lines and a plurality of second direction first power lines, the plurality of second direction first power lines being spaced apart from each other at intervals of at least two sub-pixel columns; and*

*a plurality of second power lines having a mesh structure including a plurality of first direction second power lines and a plurality of second direction second power lines, the plurality of second direction second power lines being spaced apart from each other at intervals of at least two sub-pixel columns,*

*wherein the data lines comprise a pair of data lines adjacent each other with one of the second direction second power lines interposed between the pair of data lines without a pixel between the one of the second direction second power lines and either of the pair of data lines,*

*wherein only one sub-pixel column is arranged between an adjacent pair of one of the second direction first power lines and one of the second direction second power lines,*

*wherein each sub-pixel column comprises a plurality of sub-pixels sequentially arranged along the second direction and sharing one of the plurality of data lines, and*

*wherein a row of the organic light emitting display in the first direction includes a sequential arrangement of one of the second direction first power lines, one of the sub-pixels, one of the data lines, one of the second direction second power lines, and one of the data lines.*

*21. The organic light emitting display as claimed in claim 20, wherein one of the sub-pixels comprises:*

*an organic light emitting diode (OLED);*

*a first transistor including a first electrode connected to one of the first power lines and a second electrode connected to the OLED;*

*a first capacitor including a first electrode and a second electrode, the first electrode of the first capacitor connected to a gate electrode of the first transistor;*

*a second transistor including a first electrode connected to one of the data lines and a second electrode connected to the second electrode of the first capacitor; and*

*a third transistor including a first electrode connected to the second electrode of the first transistor and a second electrode connected to the gate electrode of the first transistor.*

*22. The organic light emitting display as claimed in claim 21, wherein the one of the sub-pixels further comprises a second capacitor including a first electrode connected to the one of the first power lines and a second electrode connected to the second electrode of the second transistor.*

*23. An organic light emitting display, comprising:*

*a plurality of gate lines in a first direction;*

*a plurality of data lines in a second direction;*

*a plurality of sub-pixels formed near intersections of the gate lines and the data lines;*

*a plurality of first power lines having a mesh structure including first power lines in the first direction and first power lines in the second direction, the first power lines in the second direction being spaced apart from each other at intervals of at least two sub-pixel columns; and*

*a plurality of second power lines having a mesh structure including second power lines in the first direction and second power lines in the second direction, the second power lines in the second direction being spaced apart from each other at intervals of at least two sub-pixel columns,*

*wherein the second power lines in the second direction are disposed between two adjacent data lines of the data lines without a sub-pixel between the two adjacent data lines and the second power lines in the second direction are separated by the sub-pixels interposed between the second power lines in the second direction and the first power lines in the second direction,*

*wherein only one sub-pixel column is arranged between an adjacent pair of one of the first power lines in the second direction and one of the second power lines in the second direction,*

*wherein each sub-pixel column comprises a plurality of sub-pixels sequentially arranged along the second direction and sharing one of the plurality of data lines, and*

*wherein a row of the organic light emitting display in the first direction includes a sequential arrangement of one of the first power lines in the second direction, one of the sub-pixels, one of the data lines, one of the second power lines in the second direction, and one of the data lines.*

*24. The organic light emitting display as claimed in claim 23, wherein one of the sub-pixels comprises:*

*an organic light emitting diode (OLED);*

*a first transistor including a first electrode connected to one of the first power lines and a second electrode connected to the OLED;*

*a first capacitor including a first electrode and a second electrode, the first electrode of the first capacitor connected to a gate electrode of the first transistor;*

*a second transistor including a first electrode connected to one of the data lines and a second electrode connected to the second electrode of the first capacitor; and*

*a third transistor including a first electrode connected to the second electrode of the first transistor and a second electrode connected to the gate electrode of the first transistor.*

*25. The organic light emitting display as claimed in claim 24, wherein the one of the sub-pixels further comprises a second capacitor including a first electrode connected to the one of the first power lines and a second electrode connected to the second electrode of the second transistor.*

*26. An organic light emitting display, comprising:*

*a plurality of driving power source wiring lines having a mesh structure including a plurality of column direction driving power source wiring lines and a plurality of row direction driving power source wiring lines, each adjacent pair of the plurality of column direction driving power source wiring lines being spaced apart by at least two sub-pixel columns; and*

*a plurality of coupling blocking wiring lines having a mesh structure including a plurality of column direction coupling blocking wiring lines and a plurality of row direction coupling blocking wiring lines, each adjacent pair of the plurality of column direction coupling blocking wiring lines being spaced apart by at least two sub-pixel columns,*

*wherein at least two sub-pixel columns are disposed between adjacent column direction coupling blocking wire lines along the row direction,*

*wherein only one sub-pixel column is arranged between an adjacent pair of one of the plurality of column direction driving power source wiring lines and one of the plurality of column direction coupling blocking wiring lines,*

*wherein each sub-pixel column comprises a plurality of sub-pixels sequentially arranged along a column direction, and*

*wherein the column direction coupling blocking wiring lines are formed on the same layer as the column direction driving power source wiring lines of a same material.*

*27. An organic light emitting display, comprising:*

*a plurality of gate lines in a first direction;*

*a plurality of data lines in a second direction;*

*a plurality of sub-pixels formed near intersections of the gate lines and the data lines;*

*a plurality of first power lines having a mesh structure including first power lines in the first direction and first power lines in the second direction, the first power lines in the second direction being spaced apart from each other at intervals of at least two sub-pixel columns; and*

*a plurality of second power lines having a mesh structure including second power lines in the first direction and second power lines in the second direction, the second power lines in the second direction being spaced apart from each other at intervals of at least two sub-pixel columns,*

*wherein the sub-pixels include at least two sub-pixels that are interposed between the second power lines in the second direction and the first power lines in the second direction along the first direction,*

*wherein only one sub-pixel column is arranged between an adjacent pair of one of the first power lines in the second direction and one of the plurality of second power lines in the second direction,*

*wherein each sub-pixel column comprises a plurality of sub-pixels sequentially arranged along the second direction and sharing one of the plurality of data lines, and*

*wherein a row of the organic light emitting display in the first direction includes a sequential arrangement of one of the plurality of data lines, one of the plurality of*

*sub-pixels, one of the first power lines in the second direction, one of the plurality of sub-pixels, and one of the plurality data lines.*

*28. The organic light emitting display as claimed in claim 27, wherein one of the sub-pixels comprises:*

*an organic light emitting diode (OLED);*

*a first transistor including a first electrode connected to one of the first power lines and a second electrode connected to the OLED;*

*a first capacitor including a first electrode and a second electrode, the first electrode of the first capacitor connected to a gate electrode of the first transistor;*

*a second transistor including a first electrode connected to one of the data lines and a second electrode connected to the second electrode of the first capacitor; and*

*a third transistor including a first electrode connected to the second electrode of the first transistor and a second electrode connected to the gate electrode of the first transistor.*

*29. The organic light emitting display as claimed in claim 28, wherein the one of the sub-pixels further comprises a second capacitor including a first electrode connected to the one of the first power lines and a second electrode connected to the second electrode of the second transistor.*

* * * * *